Jan. 1, 1952 | S. G. LUTZ | 2,580,447

TIME RECORDING SYSTEM

Filed March 21, 1947 | 3 Sheets-Sheet 1

Inventor
SAMUEL G. LUTZ

By M. A. Hayes

Attorney

Jan. 1, 1952 S. G. LUTZ 2,580,447

TIME RECORDING SYSTEM

Filed March 21, 1947 3 Sheets-Sheet 2

Inventor
SAMUEL G. LUTZ

By M. O. Hayes

Attorney

Inventor
SAMUEL G. LUTZ
By M. C. Hayes
Attorney

Patented Jan. 1, 1952 2,580,447

UNITED STATES PATENT OFFICE 2,580,447

TIME RECORDING SYSTEM

Samuel G. Lutz, University Heights, N. Y.

Application March 21, 1947, Serial No. 736,190

7 Claims. (Cl. 58—24)

(Granted under the act of March 3, 1883, as amended April 30, 1928; 370 O. G. 757)

This invention relates generally to recording and reproducing systems and more particularly to novel apparatus for automatically incorporating time intelligence into a recording operation and reproducing said time intelligence during the reproducing operation.

In many sound recordings it is essential to have accurate knowledge of the time relation of the sounds recorded. For example, during a military operation in which observations are recorded from several vantage points, it is very important to preserve the time relation between the several recordings in order to reconstruct and analyze accurately the effect of the operation. A similar use is found in scientific experiments requiring observation from separated points. It is possible to use a dead reckoning method of timing by noting the time at the beginning of the recording and calculating subsequent time by measuring the progress of the needle across the recording medium. This means is of no use if the recording process is interrupted, a likely occurrence if it is desired only to record outstanding events over a considerable period of time. Furthermore, any error in the dead reckoning increases with the extent of the time interval calculated.

To be practical, a device for adding time signals to a recording operation must permit intermittent operation of the recording equipment without adjustment of the time signal source, it must prevent cumulative error, it must be sufficiently compact to be readily adaptable to the facilities of the point of observation, and particularly in military uses, it must be free of apparatus too delicate to withstand the shock of gun fire, or the vibration of locomotion. The device should further provide means for reproducing the time signals separately from the other recorded intelligence to avoid any confusion that might result from their combination.

It is therefore an object of this invention to provide an apparatus for incorporating time signals into audio recordings which may be reproduced coincident with the play back of the recordings.

It is another object of this invention to provide apparatus for automatically incorporating time signals into audio recordings irrespective of intermittent use of the recording system and not subject to cumulative error.

It is another object of this invention to provide a device for automatically incorporating time signals into audio recordings and reproducing the time signals visually and distinct from the audio signals.

It is another object of this invention to provide a means for generating a series of signal pulses representing time by scanning an electrically energized clockwork time source whose accuracy is independent of stability of the electrical power source.

It is another object of this invention to provide a means for visually representing four digit time signals on three rotatable drums.

Other objects and advantages of the invention will be apparent from the following description and accompanying drawings, in which similar characters of reference indicate similar parts throughout the several views.

In the drawings, Fig. 1 is a block diagram of one embodiment of the invention.

Fig. 2 is an isometric view of a clock and photoelectric scanner which may be used to generate time signals;

Fig. $3_A$ is an enlarged perspective view of the dials of the clock shown in Fig. 2.

Fig. $3_B$ is an oscillogram of the time signals produced when the clock dials are in the position shown in Fig. $3_A$.

Fig. 6 is a schematic diagram of a circuit suitable to operate the dials of Figs. 4 and 5.

Briefly, time signals are mixed with audio intelligence applied to a recording system. These time signals may be a variable number of voltage pulses which designate time by their number. The pulses are preferably used to modulate a carrier frequency chosen near the upper limit of the band pass of the recorder system. In reproducing the recorded sound, the time signals may be separated from the audio intelligence by suitable frequency selective networks. The time signals are most conveniently produced by scanning, either with a contact finger or an electronic photocell, a specially constructed clock work device whose dials turn up an additional contact or line for each succeeding interval of time, the number of contacts or lines determining the number of voltage pulses. In reproduction, the time signals may be used to operate dials marked with numbers instead of lines to indicate the time. The pulses themselves can be used to turn the indicating dials through step-relays. In this invention the dials are returned to zero before each new time signal is applied to permit continuous reproduction of intermittent recordings. For continuous operation the time signals will occur every thirty seconds.

Figure 1:
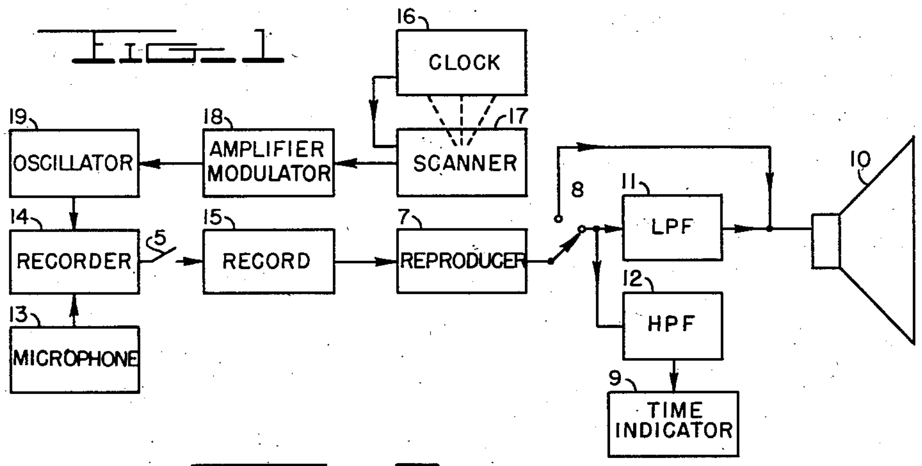

Referring now to the drawings in detail, a block diagram is shown in Fig. 1 of a complete system for recording and reproducing audio signals and automatic time signals. The reference source for the time signals comprises a clock 16 having mechanically driven dials which are described in detail below in reference to Fig. 3A. At thirty second intervals the clock 16 triggers a scanner 17 as described in reference to Fig. 2. Said scanner 17 then scans the dials of the clock 16 to produce voltage pulses described in reference to Fig. 3B which are responsive to the time indicated by the clock dials. These pulses are applied to an amplifier modulator circuit 18 to thereafter key an oscillator 19. The pulses now have the carrier frequency of the oscillator 19 and may be applied to any standard recorder 14. Audio signals may also be applied to said recorder 14 through a microphone 13. The audio signals and the time signals are then recorded upon closing switch 5, on any suitable recording medium such as a record 15, and may be reproduced on a suitable reproducer 7. The output of the reproducer 7 may be applied directly to a loud speaker 10 by throwing switch 8 to the left. If this is done the time signals will be heard simultaneously with the audio signals and the time may be calculated by counting the number of pulses in the time signal. A more convenient method, however, is to separate the time signals from the audio signals and display the former visually so that one signal will not obliterate or confuse the other. This can be done by choosing the carrier frequency of the oscillator 19 near the upper limit of the reproducer 7 and using a low pass filter 11 and high pass filter 12 at the output of the reproducer 7 to separate the signals. The low pass filter 11 will pass the audio signals to the speaker 10 and reject the time signals. The high pass filter 12 will reject the audio signals and pass the time signals to a visual time indicator 9 described below in reference to Figs. 4, 5, and 6.

Figure 2:
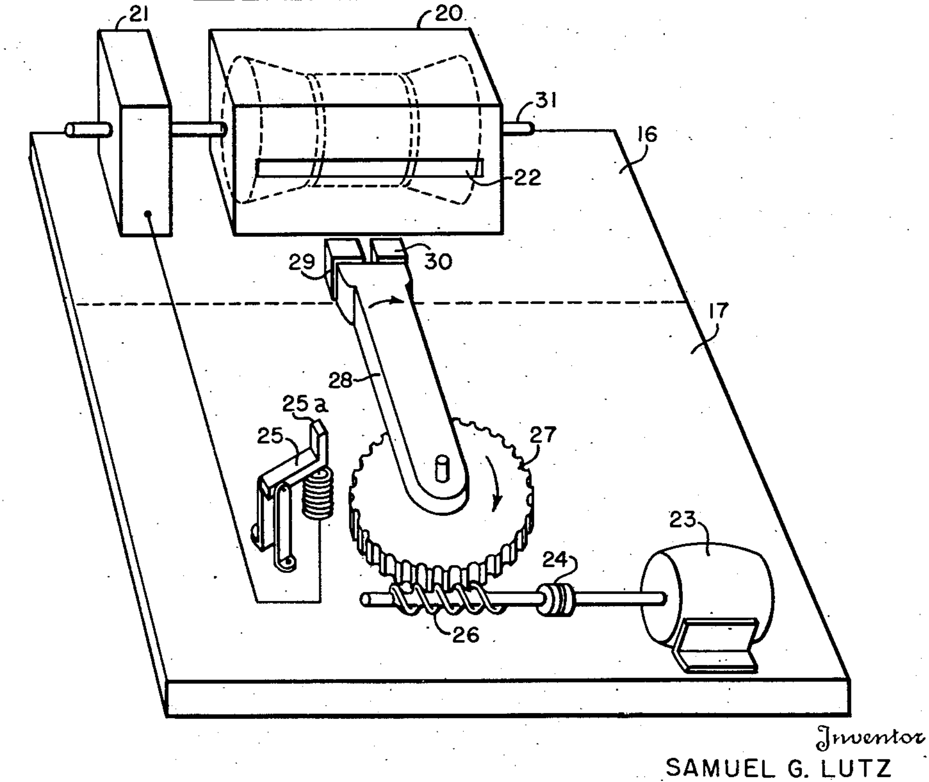

Fig. 2 illustrates an isometric view of the scanner 17 and the clock 16 of Fig. 1. The clock consists of three generally cylindrical dials which may be placed in a box 20 having a viewing slot 22 in the side facing the scanner and through which a portion of the dials is visible to the scanner 17. These dials are turned by clockwork 21 so that their position will provide a time measure. Said clockwork 21 is preferably an electrically wound spring driven mechanism similar in principle to that commonly used in automobile dashboard clocks. If the spring in the clockwork 21 runs down at 30 second intervals to the point where it closes a contact and energizes the winding mechanism, then these voltage impulses 30 seconds apart can also be used to trip the scanner 17 to provide a scan and hence a time signal every 30 seconds. The scanner can be of the photoelectric type commonly used in facsimile work. As shown here, it consists of an electric motor 23 driving a photoelectric scanning arm 28 through a suitable gear reduction such as a large gear 27 supporting the arm 28 and turned by a worm gear 26 driven by the motor 23. The pulse from the clockwork 21 starts the scanner arm 28 by energizing the release relay 25. The mechanical coupling from the electric motor 23 to the arm 28 includes a sliding clutch 24 which permits this arm to stay at rest against a catch 25*a* on the release relay 25 without shutting off or stopping said motor 23. For a scan frequency of one scan every half minute, the scanner arm should be rotated faster than once every half minute. A new time reference is supplied each time the clockwork 21 triggers the scanner 17, thus avoiding the cumulative error that would result if the scanner were left to rotate continuously. The outer end of the scanner arm 28 supports a light source and optical system 29 and a photoelectric cell 30 responsive to light from source 29 which is reflected from the dials of the clock 16. The clock dials are shown by dotted lines on their containing box 20. It is noted that the two outer dials are conical rather than cylindrical in shape and so placed with respect to the center cylindrical dial that the three together form a cylinder with a concave surface. This shape is desired because it provides a nearly uniform distance between the photocell 30 and the dials throughout the scanning arc of the scanner.

Figure 3A:
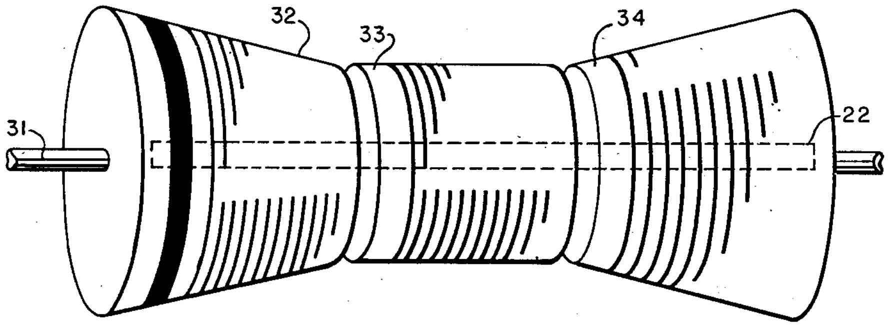

Fig. 3A is a perspective view of the clock dials enlarged to show their relative proportions, location, and time indicia. The right dial 34 is the shape of a conical section expanding to the right. Said dial 34 rotates about and may be geared or directly coupled to the shaft 31 which is turned by the clockwork 21 shown and previously described in reference to Fig. 2. The mechanical coupling of said dial and said shaft is such that said dial completes one revolution every five minutes. Said dial 34, which may be called the half minute dial, is marked with 10 bands encircling same to a varying degree. The band to the extreme left completely encircles the dial. The adjacent band extends only $\frac{9}{10}$ of the distance about the dial, the next adjacent band extends $\frac{8}{10}$ of the distance and so on to the tenth band on the extreme right which extends only one-tenth the distance about the dial. It is important that each incomplete band should start on a common line normal to all the bands. Thus, viewing the dial as it is rotated brings into view through the slot 22 first one vertical line, then 30 seconds later two vertical lines and so on. After five minutes 10 vertical lines will appear and thirty seconds later the procedure will begin again with one vertical line. The center dial 33 is a cylindrical section whose radius is equal to the adjacent end of the half minute dial 34. Said center dial also rotates about the shaft 31 and is geared either to the shaft or the half minute dial so as to rotate one-twelfth of a revolution for each complete revolution of the half minute dial. Said center dial is marked with twelve bands disposed in similar fashion to the ten marking the half minute dial so that when viewed through the slot 22, rotation of the dials brings into view another vertical line on the center dial every five minutes. This dial may be called the five minute dial. Said dial makes a complete revolution in one hour and the procedure is then repeated. The left dial 32 is similar in size and shape to the right dial 34 but it expands to the left. Its smaller end is of the same size and adjacent to the center dial 33. Said left hand dial 32 also rotates about the shaft 31 and is so geared to the system as to turn one-twelfth of one revolution for each revolution of the center dial 33. Said left dial 32 is marked with twelve bands like those marking the center dial 33 and in addition with one wide complete band placed to the left of the 12 narrower bands. The narrow bands will appear successively in the slot 22 upon rotating the dial just as in the case of the center dial 33 except that one hour will elapse before the appearance of an additional line. A complete revolution of dial 32 takes 12 hours, this dial may be called the hour dial. The single wide band at the left of the narrower bands will always appear in the slot. If the slot 22 is scanned by the scanning device 17 shown in Fig. 2, a voltage pulse will be produced for each time band appearing in the slot and the bands appearing on each dial will give rise to distinct pulse groups due to the linear separation of the dials and the dial markings. Since the number of time bands appearing in the slot is a function of time, the number of pulses in the pulse groups is also a function of time. The appearance of the single wide band at the left of the left dial is not a function of time, however and this band will produce a single pulse wider than the others. This pulse is the reset pulse and is described below in reference to Fig. 6.

In connection with Fig. 3A and also Fig. 2 it will be seen that the box 20 and the viewing slot 22 are essential only for illustrating the portion of the dials to be scanned and not for guiding the operation of the scanner.

Figure 3B:
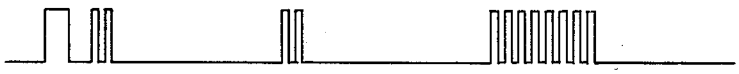

Fig. 3B is an oscillogram of the voltage pulses produced by the scanner for the dial positions shown in Fig. 3A. It should be noted that the photo electric cell scanning-means described may be replaced with a mechanical method without changing the effect produced. To do this the bands marked on the drums might consist of conducting material such as metal strips affixed to a nonconducting surface. Instead of scanning these conductors with a photocell as before they may be scanned with a rotating contact finger which will generate a voltage pulse for each conducting strip across which it sweeps by including a voltage source in series with the contact finger and the conducting strips. Similarly, this result might be obtained by the use of cam operated switches.

Figure 4:
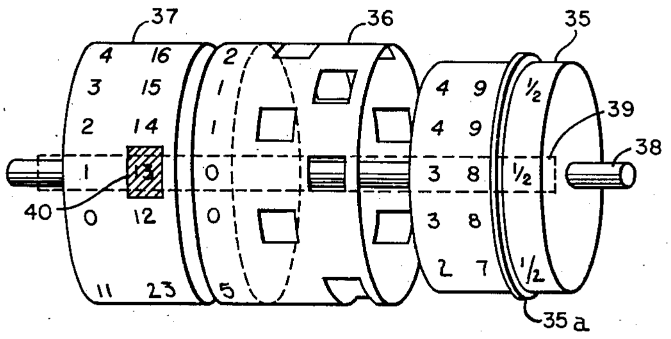
Fig. 4 is a disassembled perspective view of time indicator dials, shown in a position responsive to the dial positions of Fig. $3_A$.
Figure 5:
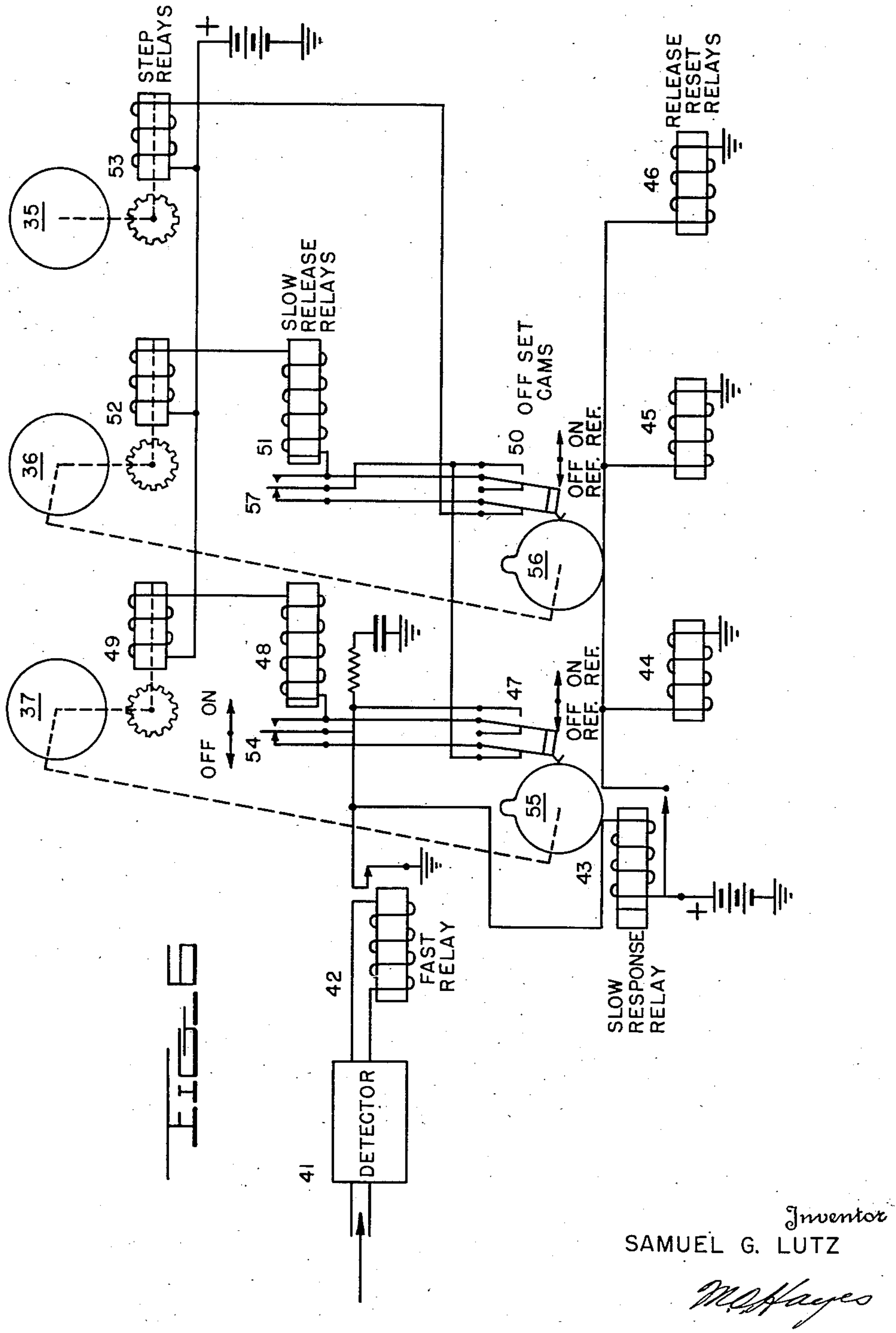

Referring to Fig. 4 in detail, the dials of the time indicator 9 of Fig. 1 are shown in an enlarged disassembled perspective view. The three dials in this figure are responsive to the time signals produced by the clock 16 of Fig. 1. Each dial of Fig. 4 responding to the signals of the corresponding dial of Fig. 3A. The electrical and mechanical means for so rotating the dials of Fig. 4 are shown by schematic diagram in Fig. 6 and the operation will be explained below in connection therewith. The right hand dial 35 responds to half minute signals and has eleven positions through which it may be rotated. One position is a reference position to which the dial is returned at the start of each scanning cycle to avoid cumulative error, the other positions are marked with numerals and measure half-minute intervals giving the dial a range of five minutes by half-minutes. In particular, there are three columns of figures extending about the circumference of the dial 35. The first column on the right is marked with the numeral "½" every other position after the reference position. The center column is marked after the reference position with once repeating numbers, beginning with the numeral "5" and continuing through the numeral "9" for each position as follows: "5," "5," "6," "6," "7," "7," "8," "8," "9," "9." The left column is marked similar to the center column but with the numbers ranging from "0" through "4". In operation the right hand dial 35 is inserted within the hollow center dial 36 as far as the flange 35a separating the center and the right column of figures on the right dial.

The center dial 36 contains thirteen positions to which it may be rotated, one is a reference position and the other twelve are marked with numerals indicating five minute intervals making the range of the dial one hour. The center dial also has three indicating columns but only the left one is marked with figures. This column is marked with the numbers "0" through "5," and each is repeated once making a total of twelve figures. The center and right column consist of alternate windows cut every other position about the drum with the exception of the reference position and through which the figures on the left and center columns of the half minute dial 35 are rendered alternately visible as will hereinafter be explained. A viewing slot 39 is shown in the drawing by dotted lines. This slot is cut in the box retaining the dials so that only one position of each dial is visible at a time. The appropriate number of the center or left columns of the right dial 35 is visible through whichever column of the center dial 36 has a window in the viewing slot 39. It will be noted that in any ten minute period for the first five minutes the lower five numbers of the minute digit as represented by the left column of dial 35 may be viewed successively through the window in dial 36 adjacent the first appearance of the ten minute digit as seen in the left column of center dial 36. After all the lower numbers have been seen the dial 36 will move one position and bring a window from its right column into view but still display the same number in its left column. The center column of dial 35 marked with the upper five numbers of the minute digit will be seen for the next five minutes in the viewing slot through a right window of the center dial 36. It should be remembered that these dials do not revolve continuously like the time clock dials but return to the reference position between every new time reading.

The left dial 37 also has thirteen positions and moves one position for each hour of time thereby giving it a range of 12 hours. The dial is marked with two columns of figures, the one on the left ranging from "0" through "11" and the one on the right from "12" through "23." A sliding mask 40 placed over the viewing slot 39 may be manually moved to cover either one of the columns to distinguish a. m. readings from p. m. The dials are shown in the positions they would assume in response to the voltage pulse groups shown in Fig. 3. The wide pulse on the left returns all dials to the reference position. The first pulse group actuates the left dial moving it two positions to either "1" or "13" depending upon the position of the sliding mask 40. The next group of two pulses actuates the center dial moving it two positions so that the second "0" and a right window appear in viewing slot 39. The last group of pulses numbering eight, actuates the right dial moving it 8 positions bringing up the numbers "3," "8," and "½." The "8" is visible through a right window of the center dial and the "½" is visible to the right of the center dial. The time indication thereby produced is either 1:08½ or 13:08½ depending on the position of the mask 40.

Figure 5:
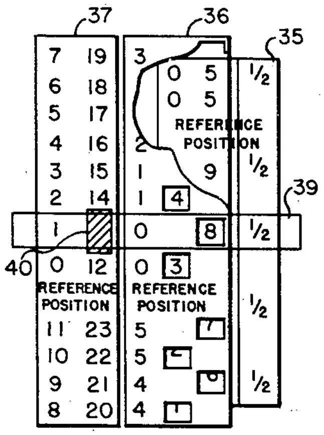
Fig. 5 is a partially cut away view of the assembled dials of Fig. 4 whose periphery is here shown unrolled to illustrate the markings thereon.

Referring now to Fig. 5, the three dials of Fig. 4 are shown in assembled position but unrolled to show the complete markings thereon. The center dial 36 is partially cut away to illustrate the markings on the portion of the right dial 35 which lies within the center dial 36. The dials are so arranged that their relative positions are the same as in Fig. 4 and it will be noted that the time 1:08½ may be read through the viewing slot 39. The cooperative association of the indicating dials may be better understood by taking this view in connection with Fig. 4. It may be noted that the indicating dials of Figs. 4 and 5 are not continuously rotated as are the clockwork dials of Fig. 3A, they are instead reset to a zero reference position before each new pulse transmission so any time lapse in the recording will not affect the accuracy of the received time transmission.

Referring to Fig. 6, there is shown a schematic diagram of the drive mechanism for the visual time indicator 16. Each of the three indicating dials, the hour dial, 37, the minute dial 36 and the half minute dial 35 are independently driven by separate step relays 49, 52 and 53. The step relays move their associated dials one step from the reference position for each pulse applied to them. Cams 55 and 56 are mechanically connected to the dials 37 and 36 respectively in such a manner, that when dials 37 and 36 are returned to reference position then the spring contacts 47 and 50 are moved to their reference positions by the small projections of cams 55 and 56. Relay 43 is a slow response relay which is responsive only to the long reset pulse. When relay 43 responds it energizes relays 44, 45, and 46. Relays 44, 45 and 46 are release relays which release the step relays 49, 52 and 53 respectively when they are energized, and thereby return dials 37, 36 and 35 respectively to their reference positions. Relays 48 and 51 are slow release relays actuating contacts 54 and 57 respectively. Said relays 48 and 51 will respond to the first pulse of a group and remain closed throughout the group. Relay 42 is a fast acting relay, responsive to the output of detector 41, it responds to each individual pulse.

Detector 41 demodulates the incoming signal and applies the pulse transmission to relay 42. The pulse transmission consists of a long reset pulse and three groups of pulses, one group to operate each dial.

The initial long pulse energizes relay 42 and the slow response relay 43, which energizes the reset release relays 44, 45, and 46 causing the indicator dials 37, 36, and 35 and the cams 55 and 56 to return to their reference position where they change switches 47 and 50 from the "off reference" position to the "on reference" position.

The first short pulse of group 1 is applied to step relay coil 49 through the slow release relay coil 48, the "on reference" position of contacts 47, and the contacts of relay 42. This first short pulse moves dial 37 one step thus moving cam 55 and throwing contacts 47 to the "off reference" position. It also moves contacts 54 to the "on" position for the remaining pulses of group 1 by energizing the slow release relay 48. The remaining short pulses of group 1 complete the circuit through step relay 49, slow release relay coil 48, through the "on" position of contacts 54 shunting the now open contact 47, through contacts of relay 42 to ground, advancing dial 37 to its proper position.

The slow release relay 48 will release after a definite time, which is between the first pulse group and second pulse group, thus setting up the circuit through contacts 54 and 47 to the second dial step relay 51. The first short pulse of the second pulse group is applied to step relay coil 52 through the "reference" position of contacts 50, the "off reference" position of contacts 47, the "off" position of contacts 54, and contacts 42 to ground. This pulse energizes a slow release relay 51 which throws contact 57 to the "on" position for the remainder of the second pulse group. The remaining pulses move dial 36 to its proper position, the circuit being completed through step relay coil 52, coil 51, the "on" position of contacts 57, the "off reference" position of contacts 47, the "off" position of contacts 54 and relay contacts 42 to ground. The slow release relay 51 releases between pulse groups 2 and 3 returning contacts 57 to the "off" position.

The third pulse group energizes step relay coil 53 through the "off reference" position of contact 50, the "off reference" position of contacts 47, the "off" position of contacts 54, and the contacts of relay 42 to ground, thus moving dial 35 to the desired position.

Although certain specific embodiments of this invention have been herein disclosed and described, it is to be understood that they are merely illustrative of this invention and modifications may of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. In combination, a clock operated pulse time generator periodically operative to produce a wavetrain of voltage pulses comprising a first pulse group of one to twelve pulses representing the hours of the day, a second pulse group of one to twelve pulses representing five minute intervals, a third pulse group of one to ten pulses representing half minutes, a time indicating means responsive to said three pulse groups and operative to indicate time in terms of hours, minutes, and half minutes.

2. In combination, a clock operated pulse time generator periodically operative to produce at half minute intervals a wavetrain of voltage pulses comprising a first pulse group of one to twelve pulses representing the hours of the day, a second pulse group of one to twelve pulses representing five minute intervals, a third pulse group of one to ten pulses representing half minute intervals, and a time indicating means including three relay operated dials, the first said dial movable to twelve positions in response to said first pulse group, the second of said dials movable to twelve positions in response to said second pulse group, and the third of said dials movable to ten positions in response to said third pulse group, whereby the time is indicated in terms of hours, minutes, and half minutes.

3. In combination, a clock operated pulse time generator periodically operative to produce at half minute intervals a first pulse group of not more than 12 pulses representing the hours of the day, a second pulse group of not more than 12 pulses representing five minute intervals, a third pulse group of not more than 10 pulses representing half minute intervals, and a single pulse preceding said pulse groups, and a time indicating means including three relay operated dials, the first said dial movable to twelve positions in response to said first pulse group, the second of said dials movable to twelve positions in response to said second pulse group, a series of twelve alternately spaced apertures formed in said second dial, and the third of said dials movable to ten positions in response to said third pulse group, said third dial being located partly within said second dial and partly viewed through said alternately spaced apertures in said second dial, and relay means operatively associated with said time indicator to return said three dials to a reference position before each series of time pulse groups in response to said single pulse, whereby the time is indicated in terms of hours, minutes, and half minutes.

4. In combination, a clock operated pulse time generator comprising three co-linear cooperatively associated rotatable drums each having a series of spaced circumferential time marks of graduated lengths formed thereon, the time marks formed on the first drum serving to define hour intervals of time, the time marks formed on the second drum serving to define five minute intervals of time, and the time marks formed on the third drum serving to define half minute intervals of time, clockwork means operatively associated with said drums for so rotating the same that said first drum makes a complete revolution every twelve hours, said second drum a complete revolution every hour and said third drum a complete revolution every five minutes, a pulse producing means periodically scanning said drums and operative responsive to the time marks formed thereon to produce three distinct pulse groups, wherein the first pulse group is indicative of the hour, the second of the five minute intervals and the third of the half minute intervals, and a time indicating means including three relay operated dials, the first said dials movable to twelve positions in response to said first pulse group, the second of said dials movable to twelve positions in response to said second pulse group, and the third of said dials movable to ten positions in response to said third pulse group, whereby the time is indicated in terms of hours, minutes, and half minutes.

5. A clock operated pulse time generator comprising three co-linear cooperatively associated rotatable drums each having a series of spaced circumferential time marks of graduated lengths formed thereon, the time marks formed on the first drum serving to define hour intervals of time, the time marks formed on the second drum serving to define five minute intervals of time, and the time marks formed on the third drum serving to define half minute intervals of time, clockwork means operatively associated with said drum for so rotating the same that said first drum makes a complete revolution every twelve hours, said second drum a complete revolution every hour and said third drum a complete revolution every five minutes, a pulse producing means periodically scanning said drums and operative responsive to the time marks formed thereon to produce three distinct pulse groups, wherein the first pulse group is indicative of the hour, the second of the five minute intervals and the third of the half minute intervals.

6. A clock operated pulse time generator comprising three co-linear cooperatively associated rotatable drums each having a series of spaced circumferential time marks of graduated lengths formed thereon, the first drum having twelve time marks thereon serving to define hour intervals of time, the second drum having twelve time marks thereon serving to define five minute intervals of time, and the third drum having ten time marks thereon serving to define half minute intervals of time, clockwork means operatively associated with said drums for so rotating the same that said first drum makes a complete revolution every 12 hours, said second drum a complete revolution every hour, and said third drum a complete revolution every five minutes, a pulse producing means including a photo-electric scanning device periodically scanning said drums and operative responsive to the time marks formed thereon to produce three distinct pulse groups, wherein the first pulse group is indicative of the hour, the second of five minute intervals and the third of half minute intervals.

7. In a recording and reproducing system having means for impressing on a recording medium pulse time signals indicative of the time of day and comprising a first group of not more than twelve pulses indicative of the hour, a second group of not more than twelve pulses indicative of five minute intervals, and a third group of not more than ten pulses indicative of half minute intervals, apparatus for reproducing the time intelligence having a first dial movable to twelve positions marked in hours, a step relay operatively associated with said first dial and responsive to said first pulse group, a second dial movable to twelve positions, a second step relay operatively associated with said second dial and responsive to said second pulse group, said dial being marked with once repeating numerals representative of ten minute intervals, a third dial movable to ten positions, a third step relay operatively associated with said third dial and responsive to said third pulse group, said third dial containing three columns of numerals, the first column consists of a series of once repeating numerals representative of one minute intervals extending from zero time minutes to five minutes, the second column consists of once repeating numerals representative of one minute intervals extending from five minutes to ten minutes, the third column consists of half minute markings appearing adjacent alternate markings of the second column, whereby time is visibly indicated in terms of hours, minutes, and half minutes.

SAMUEL G. LUTZ.

REFERENCES CITED

The following references are of record in the file of this patent:

UNITED STATES PATENTS

| Number | Name | Date |
|---|---|---|
| 700,454 | Thrasher | May 20, 1902 |
| 2,116,314 | Jenkins | May 3, 1938 |
| 2,141,203 | Abbott | Dec. 27, 1938 |
| 2,145,018 | Tweedale | Jan. 24, 1939 |
| 2,188,145 | Frantz | Jan. 23, 1940 |
| 2,271,539 | Bryce | Feb. 3, 1942 |
| 2,417,129 | Rusch | Mar. 11, 1947 |